(12) United States Patent
Hsu

(10) Patent No.: US 9,207,083 B2
(45) Date of Patent: Dec. 8, 2015

(54) ELECTRONIC DEVICE AND NAVIGATION METHOD FOR TRACKING TARGET DEVICE

(71) Applicant: Chi Mei Communication Systems, Inc., New Taipei (TW)

(72) Inventor: Ming-Feng Hsu, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 0 days.

(21) Appl. No.: 13/956,441

(22) Filed: Aug. 1, 2013

(65) Prior Publication Data

US 2014/0067255 A1 Mar. 6, 2014

(30) Foreign Application Priority Data

Aug. 30, 2012 (TW) .............. 101131439 A

(51) Int. Cl.
*G01C 21/00* (2006.01)
*G01C 21/20* (2006.01)
*G01C 21/34* (2006.01)

(52) U.S. Cl.
CPC ............... *G01C 21/00* (2013.01); *G01C 21/20* (2013.01); *G01C 21/3438* (2013.01)

(58) Field of Classification Search
CPC ............................... G01C 21/26; G01C 21/00
USPC .......... 701/412, 431, 468, 517, 521; 340/539.21, 539.32
See application file for complete search history.

(56) References Cited

U.S. PATENT DOCUMENTS

| | | | | |
|---|---|---|---|---|
| 6,363,324 | B1 * | 3/2002 | Hildebrant | 701/468 |
| 6,510,381 | B2 * | 1/2003 | Grounds et al. | 701/517 |
| 6,738,712 | B1 * | 5/2004 | Hildebrant | 701/431 |
| 7,817,033 | B2 * | 10/2010 | Motoyama | 340/539.32 |
| 7,911,337 | B2 * | 3/2011 | King et al. | 340/539.21 |
| 2001/0034577 | A1 * | 10/2001 | Grounds et al. | 701/207 |
| 2014/0067255 | A1 * | 3/2014 | Hsu | 701/412 |

* cited by examiner

*Primary Examiner* — Thomas G Black
*Assistant Examiner* — Wae Louie
(74) *Attorney, Agent, or Firm* — Novak Druce Connolly Bove + Quigg LLP

(57) ABSTRACT

In a navigation method for tracking a second electronic device using a first electronic device, the first electronic device receives position information of the second electronic device. A position of the second electronic device is marked on a navigation map stored in the first electronic device. The first electronic device is directed to track the second electronic device according to the marked position on the navigation map.

15 Claims, 3 Drawing Sheets

ELECTRONIC DEVICE AND NAVIGATION METHOD FOR TRACKING TARGET DEVICE

BACKGROUND

1. Technical Field

Embodiments of the present disclosure relate to navigation technology, and particularly to an electronic device and a navigation method for tracking a target device.

2. Description of Related Art

In a navigation method, a known location is a directing target of an electronic device, and then a suitable path is determined by a global positioning system (GPS) for reference. A user can use the navigation method to direct to an unfamiliar location. However, the directing target in the navigation method is static, so a user cannot use the navigation method to track a moving target.

For example, in a tour group, a tour guide leads tourists along a path, and the tourists need to follow the tour guide. If a tourist strays from the group, the tourist may not be able to use the navigation method to track the tour guide as the tour guide keeps moving. Therefore, an improved navigation method for tracking a moving target device is desired.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean "at least one."

All of the processes described below may be embodied in, and fully automated via, functional code modules executed by one or more general purpose electronic devices or processors. The code modules may be stored in any type of non-transitory computer-readable medium or other storage device. Some or all of the methods may alternatively be embodied in specialized hardware. Depending on the embodiment, the non-transitory computer-readable medium may be a hard disk drive, a compact disc, a digital video disc, a tape drive or other suitable storage medium.

Figure 1:
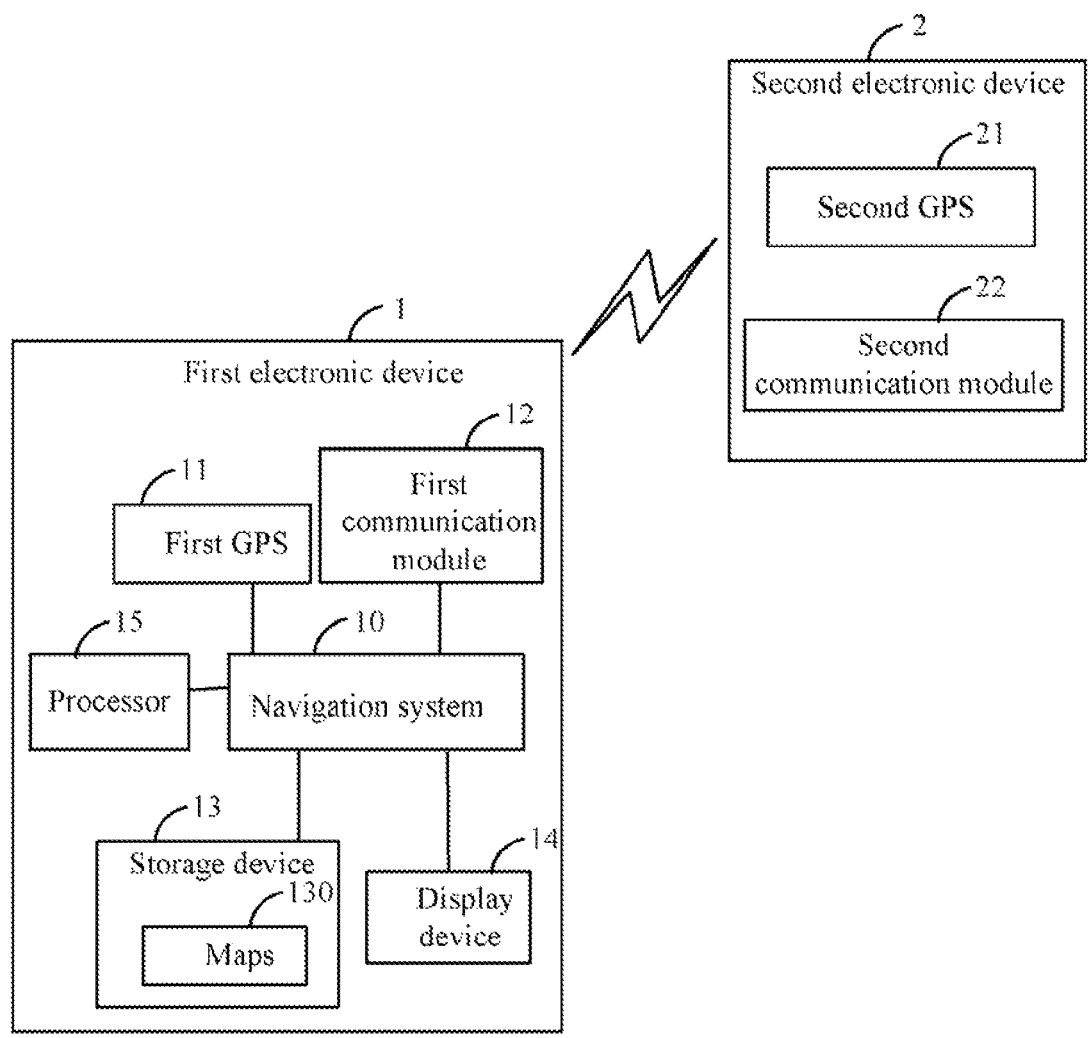
FIG. 1 is a block diagram of one embodiment of a first electronic device in communication with a second electronic device.

FIG. 1 is a block diagram of one embodiment of a first electronic device 1 in communication with a second electronic device 2. The electronic device 1 includes a navigation system 10, a first global positioning system (GPS) 11, a first communication module 12, a storage device 13, a display device 14, and at least one processor 15. The second electronic device 2 includes a second GPS 21 and a second communication module 22. In other embodiments, the first electronic device 1 and the second electronic device 2 may include more or fewer components than illustrated, or have a different configuration of the various components.

In some embodiments, the first electronic device 1 is a tracker, and the second electronic device 2 is a target device to be tracked by the first electronic device 1. The first electronic device 1 and the second electronic device 2 may be mobile phones, tablet computers, personal digital assistants, notebook computers, or other similar devices. The navigation system 10 periodically receives position information of the second electronic device 2, and directs the first electronic device 1 to track the second electronic device 2 according to the received position information.

The first electronic device 1 uses the first communication module 12 to communicate with the second communication module 22 of the second electronic device 2 through a wireless network, such as the Internet, the Global System for Mobile communication (GSM) network, the General Packet Radio Service (GPRS) network, the third generation (3G) telecommunication network, or WIFI, for example.

In another embodiment, a third electronic device (not shown in FIG. 1) is carried with either the first electronic device 1 or the second electronic device 2. The third electronic device supports both short-distance communication (e.g., WIFI, BLUETOOTH) and long-distance communication (e.g., the Internet, or the 3G telecommunication network). The third electronic device is paired with either the first electronic device 1 or the second electronic device 2 to communicate with the other electronic device over long-distance communication. For example, the first electronic device 1 is a GPS device installed on a car, and the first electronic device 1 only supports the short-distance communication, and the third electronic device (e.g., a mobile phone) is carried with people in the car. Depending on the embodiment, the third electronic device communicates with the first electronic device 1 via the short-distance communication, and communicates with the second electronic device 2 via the long-distance communication, so as to transmit data between the first electronic device 1 and the second electronic device 2.

The first GPS 11 acquires position information of the first electronic device 1. The second GPS 21 acquires position information of the second electronic device 2.

In one embodiment, the navigation system 10 may include computerized instructions in the form of one or more programs that are executed by the at least one processor 15 and stored in the storage device 13. The storage device 13 stores one or more programs, such as operating systems, applications of the first electronic device 1, and various kinds of data, such as a plurality of maps 130. In some embodiments, the storage device 13 may be an external storage card, such as a memory stick, a smart media card, a compact flash card, a secure digital card, or any other type of memory storage device.

The display device 14 may be a light-emitting diode (LED) display or a touch panel (e.g., a capacitive touch panel), for example.

Figure 2:
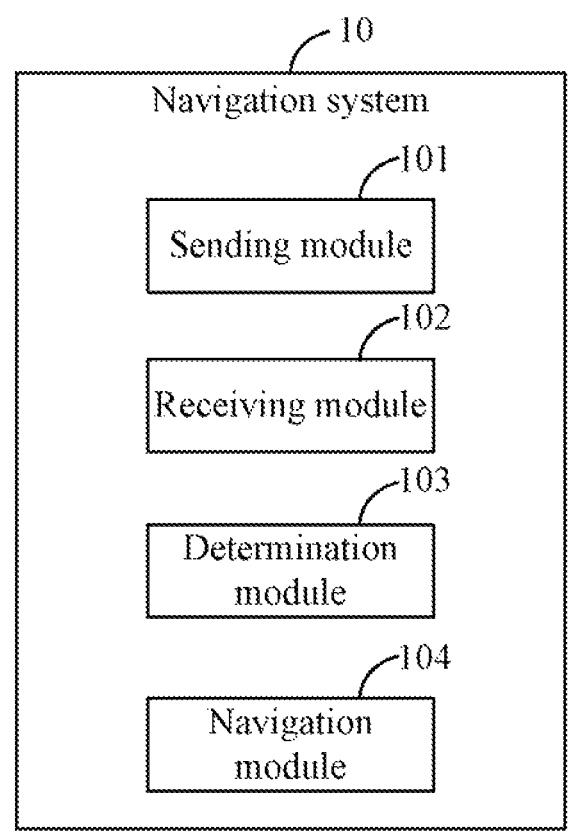
FIG. 2 is a block diagram of a navigation system in the first electronic device.

FIG. 2 is a block diagram of the navigation system 10 of the first electronic device 1. The navigation system 10 may include a sending module 101, a receiving module 102, a determination module 103, and a navigation module 104. In general, the word "module," as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 3:
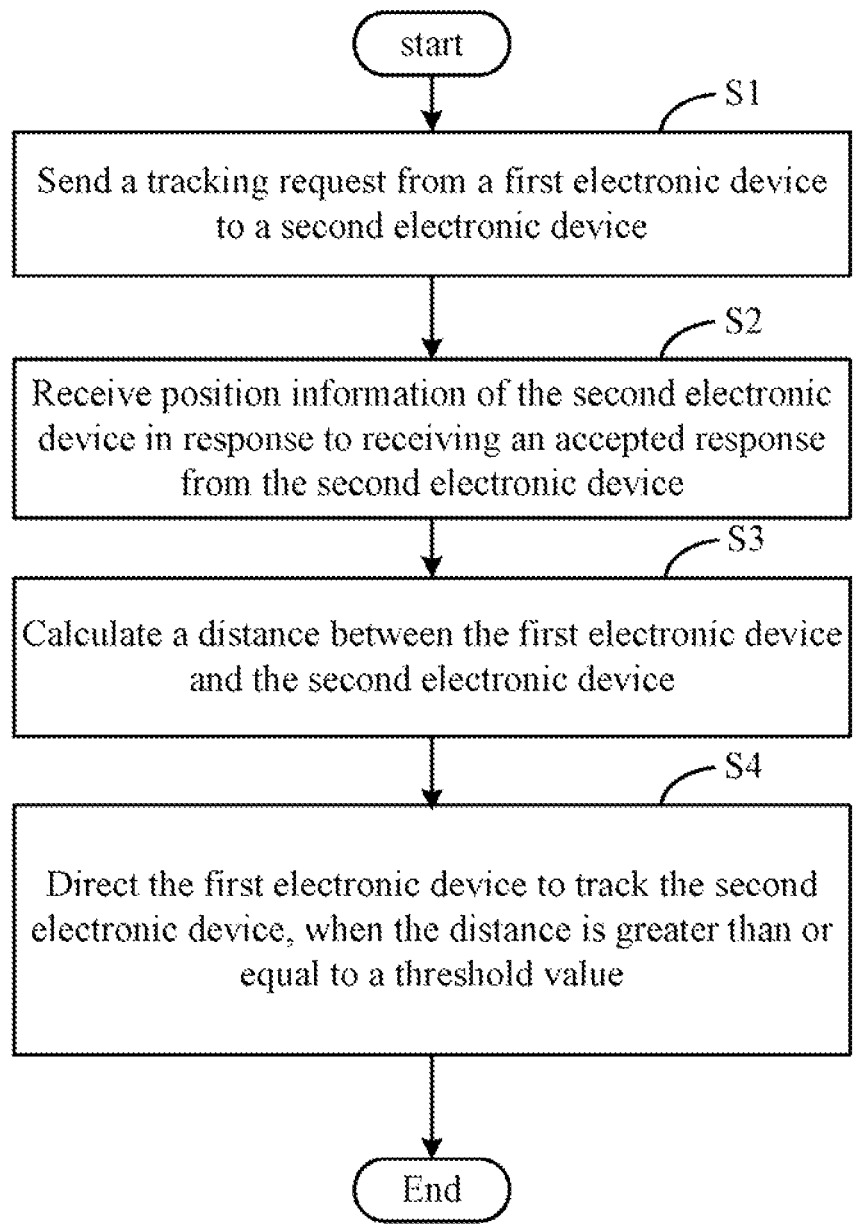
FIG. 3 is a flowchart of one embodiment of a navigation method for tracking a target device using the navigation system.

FIG. 3 is a flowchart of one embodiment of a navigation method for tracking a target device (e.g., the second electronic device 2) using the navigation system 10. Depending on the embodiment, additional steps may be added, others removed, and the ordering of the steps may be changed.

In step S1, the sending module 101 sends a tracking request from the first electronic device 1 to the second electronic device 2 using the first communication module 12 and the second communication module 22. When the second electronic device 2 receives the tracking request, the second electronic device 2 may send an accepted response to the electronic device 1 to accept the tracking request, or send a rejected response to the electronic device 1 to reject the tracking request, according to a user selection performed on the second electronic device 2.

When a user of the second electronic device 2 chooses to accept the tracking request, the second electronic device 2 sends the accepted response to the first electronic device 1, and then the second electronic device 2 sends position information acquired from the second GPS 21 to the first electronic device 1. The second electronic device 2 sends the position information at each predetermined time interval (e.g., 5 second) to the first electronic device 1. The position information may include a longitude, a latitude, and an altitude of a position of the second electronic device 2, for example. When the user of the second electronic device 2 chooses to reject the tracking request, the second electronic device 2 sends a rejected response to the first electronic device 1, and no position information of the second electronic device 2 is sent to the first electronic device 1. If the receiving module 102 receives the rejected response from the second electronic device 2, the procedure ends When the receiving module 102 receives the accepted response from the second electronic device 2, in step S2, the receiving module 102 receives the position information of the second electronic device 2.

In step S3, the first GPS 11 acquires position information of the first electronic device 1, and the determination module 103 calculates a distance between the first electronic device 1 and the second electronic device 2 according to the position information of the first electronic device 1 and the second electronic device 2.

In step S4, when the distance between the first electronic device 1 and the second electronic device 2 is greater than or equal to a threshold value (e.g., 10 meters), the navigation module 104 chooses a navigation map from the maps 130 according to the position information of the first electronic device 1 and the second electronic device 2, and directs the first electronic device 1 to track the second electronic device 2 according to the marked position on the navigation map (e.g., the position information of the second electronic device 2). The navigation module 104 further marks the position of the second electronic device 2 on the navigation map, and displays the navigation map on the display device 14.

When the distance between the first electronic device 1 and the second electronic device 2 is less than the threshold value, the procedure ends. In other embodiments, step S4 is executed regardless of the distance, such that the determination module 103 does not need to calculate the distance between the first electronic device 1 and the second electronic device 2 in step S3.

Since the first electronic device 1 receives updated position information of the second electronic device 2 at each predetermined time interval, the navigation module 104 updates the marked position of the second electronic device 2 on the navigation map, and then directs the first electronic device 1 to track the second electronic device 2 according to the updated position information of the second electronic device 2.

The navigation module 104 further marks a path from the first electronic device 1 to the second electronic device 2.

When the first electronic device 1 or the second electronic device 2 are moved outside a range of the navigation map, an updated navigation map is downloaded and displayed by the navigation module 104.

In other embodiments, if the first electronic device 1 has no GPS device (e.g., the first GPS 11), the second electronic device 2 may acquire position information including a street/road name, a name of a specific building, for example. Then the second electronic device 2 transmits the position information to the first electronic device 1 using a message. Then, the navigation module 104 outputs the message received from the second electronic device 2, to prompt the user of the first electronic device 1 a newly location of the second electronic device 2. The message may be outputted using the display device 14, or a speaker of the first electronic device 1.

It should be emphasized that the above-described embodiments of the present disclosure, particularly, any embodiments, are merely possible examples of implementations, set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure is protected by the following claims.

What is claimed is:

1. A computer-implemented navigation method for tracking a second electronic device using a first electronic device, the first electronic device comprising a first global positioning system (GPS), and the second electronic device comprising a second GPS, the method comprising:
   receiving position information of the second electronic device;
   acquiring position information of the first electronic device from the first GPS;
   calculating a distance between the first electronic device and the second electronic device according to the position information of the first electronic device and the second electronic device;
   choosing a navigation map according to the position information of the first electronic device and the second electronic device;
   marking a position of the second electronic device on the navigation map;
   starting to track the second electronic device when the distance is greater than a threshold value;
   directing the first electronic device to track the second electronic device according to the marked position on the navigation map; and
   stopping tracking the second electronic device when the distance is less than the threshold value.

2. The method according to amended claim 1, further comprising:
   sending a tracking request from the first electronic device to the second electronic device; and
   in response to receiving an accepted response from the second electronic device, implementing the step of receiving position information of the second electronic device.

3. The method according to amended claim 1, further comprising:
   receiving updated position information of the second electronic device at each predetermined time interval;

updating the marked position of the second electronic device on the navigation map according to the updated position information; and directing the first electronic device to track the second electronic device according to the updated marked position on the navigation map.

4. The method according to amended claim 1, wherein the position information comprises longitude, latitude, and altitude of the position of the second electronic device.

5. The method according to amended claim 1, wherein the first electronic device and the second electronic device communicates over a wireless network.

6. An electronic device in communication with a target electronic device, comprising:
   a first global positioning system (GPS);
   at least one processor; and
   a storage device storing a plurality of instructions, which when executed by the at least one processor, causes the at least one processor to:
   receive position information of the target electronic device;
   acquire position information of the electronic device from the first GPS;
   calculate a distance between the first electronic device and the second electronic device according to the position information of the first electronic device and the second electronic device;
   choose a navigation map according to the position information of the electronic device and the target electronic device;
   mark a position of the target electronic device on the navigation map;
   start to track the second electronic device when the distance is greater than a threshold value;
   direct the electronic device to track the target electronic device according to the marked position on the navigation map; and
   stop tracking the second electronic device when the distance is less than the threshold value.

7. The electronic device according to claim 6, wherein the at least one processor further:
   sends a tracking request from the electronic device to the target electronic device; and
   in response to receiving an accepted response from the target electronic device, starts to receive position information of the target electronic device.

8. The electronic device according to claim 6, wherein the at least one processor further:
   receives updated position information of the target electronic device at each predetermined time interval;
   updates the marked position of the target electronic device on the navigation map according to the updated position information; and
   directs the electronic device to track the target electronic device according to the updated marked position on the navigation map.

9. The electronic device according to claim 6, wherein the position information comprises longitude, latitude, and altitude of the position of the target electronic device.

10. The electronic device according to claim 6, wherein the electronic device and the target electronic device communicates over a wireless network.

11. A non-transitory storage medium having stored thereon instructions that, when executed by a processor of a first electronic device, causes the first electronic device to perform a navigation method for tracking a second electronic device, the first electronic device further comprising a first global positioning system (GPS), and the second electronic device comprising a second GPS, the method comprising:
   receiving position information of the second electronic device;
   acquiring position information of the first electronic device from the first GPS;
   calculating a distance between the first electronic device and the second electronic device according to the position information of the first electronic device and the second electronic device;
   choosing a navigation map according to the position information of the first electronic device and the second electronic device;
   marking a position of the second electronic device on the navigation map;
   starting to track the second electronic device when the distance is greater than a threshold value;
   directing the first electronic device to track the second electronic device according to the marked position on the navigation map; and
   stopping tracking the second electronic device when the distance is less than the threshold value.

12. The non-transitory storage medium according to amended claim 11, wherein the method further comprises:
   sending a tracking request from the first electronic device to the second electronic device; and
   in response to receiving an accepted response from the second electronic device, implementing the step of receiving position information of the second electronic device.

13. The non-transitory storage medium according to amended claim 11, wherein the method further comprises:
   receiving updated position information of the second electronic device at each predetermined time interval;
   updating the marked position of the second electronic device on the navigation map according to the updated position information; and
   directing the first electronic device to track the second electronic device according to the updated marked position on the navigation map.

14. The non-transitory storage medium according to amended claim 11, wherein the position information comprises longitude, latitude, and altitude of the position of the second electronic device.

15. The non-transitory storage medium according to amended claim 11, wherein the first electronic device and the second electronic device communicates over a wireless network.

* * * * *